US007171717B2

United States Patent
Leu

(10) Patent No.: US 7,171,717 B2
(45) Date of Patent: Feb. 6, 2007

(54) WINDSHIELD WIPER AND SPOILER COMBINATION

(75) Inventor: Robert Leu, Taipei (TW)

(73) Assignee: Rain First Special Wiper Co., Ltd., Taipei (TW)

( * ) Notice: Subject to any disclaimer, the term of this patent is extended or adjusted under 35 U.S.C. 154(b) by 0 days.

(21) Appl. No.: 10/832,304

(22) Filed: Apr. 27, 2004

(65) Prior Publication Data

US 2006/0179598 A1 Aug. 17, 2006

(51) Int. Cl.
*B60S 1/38* (2006.01)
*B60S 1/32* (2006.01)

(52) U.S. Cl. .............................. 15/250.201; 15/250.44

(58) Field of Classification Search ........... 15/250.201, 15/250.44, 250.361, 250.43, 250.48, 250.351; D12/219, 220
See application file for complete search history.

(56) References Cited

U.S. PATENT DOCUMENTS 3,234,578 A * 2/1966 Golub et al. ........... 15/250.201
5,042,106 A * 8/1991 Maubray ............... 15/250.201
6,338,178 B1 * 1/2002 Leu ....................... 15/250.201
D453,316 S * 2/2002 Watanabe ................. D12/219
6,681,441 B1 * 1/2004 Charng .................... 15/257.01
D494,125 S * 8/2004 Leu ............................. D12/219
6,799,347 B1 * 10/2004 Chiang ................... 15/250.201

FOREIGN PATENT DOCUMENTS

EP 0499829 * 1/1992
FR 2689835 * 10/1993

* cited by examiner

Primary Examiner—Gary K. Graham
(74) Attorney, Agent, or Firm—Leong C. Lei

(57) ABSTRACT

A windshield wiper spoiler essentially comprised of a plate spoiler connected with a folded plate to the wiper blade; rectangular openings respectively formed in the center and on both sides between the spoiler and the blade; plate protrusions being respectively provided to the rectangular openings on both sides; both ends of the spoiler being inwardly folded to each from a slightly erected flap; the surface of the spoiler indicating inclined folding; two shuttle shape ventilation holes being provided in symmetric on both sides to allow the wind force to escape upward without expanding to outer sides as limited by both flaps, thus to increase the compressing force to facilitate the operation of the windshield wiper.

1 Claim, 4 Drawing Sheets

WINDSHIELD WIPER AND SPOILER COMBINATION

BACKGROUND OF THE INVENTION (a) Technical Field of the Invention

The present invention is related to a windshield wiper spoiler, and more particularly to one that helps achieve more smooth operation of the wiper and improve the wiping results.

(b) Description of the Prior Art

To reduce the wind drag for the windshield wiper in operation as illustrated in FIG. 1 of the accompanying drawings, a spoiler 12 is provided on the front edge of a blade 11 of a windshield wiper to create disturbance for causing the incoming wind force to create compression force, thus for the wiper to avoid being lifted by the wind and instead, to become more flushed against the windshield to improve the result of removing the storm water. However, in the case of greater wind velocity, the spoiler 12 fails to fully prevent the wiper from being lifted by the wind.

SUMMARY OF THE INVENTION

The primary purpose of the present invention is to provide an improved structure for the windshield wiper spoiler to actually prevent the wiper in operation from being lifted by the wind thus to improve the result of removing storm water. To achieve this purpose, a plate spoiler is connected with a folded plate to the wiper blade. Multiple rectangular openings are respectively formed in the center and on both sides between the spoiler and the blade. Two plate protrusions being respectively extended from the rectangular openings on both sides and both ends of the spoiler are each inwardly folded to from a slightly erected flap. The surface of the spoiler indicates an inclined folding. Two shuttle shape ventilation holes are provided in symmetric respectively on both sides to allow the wind force escape upward without expanding toward outer sides as limited by both flaps, thus to increase the compressing force to facilitate the operation of the wiper.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
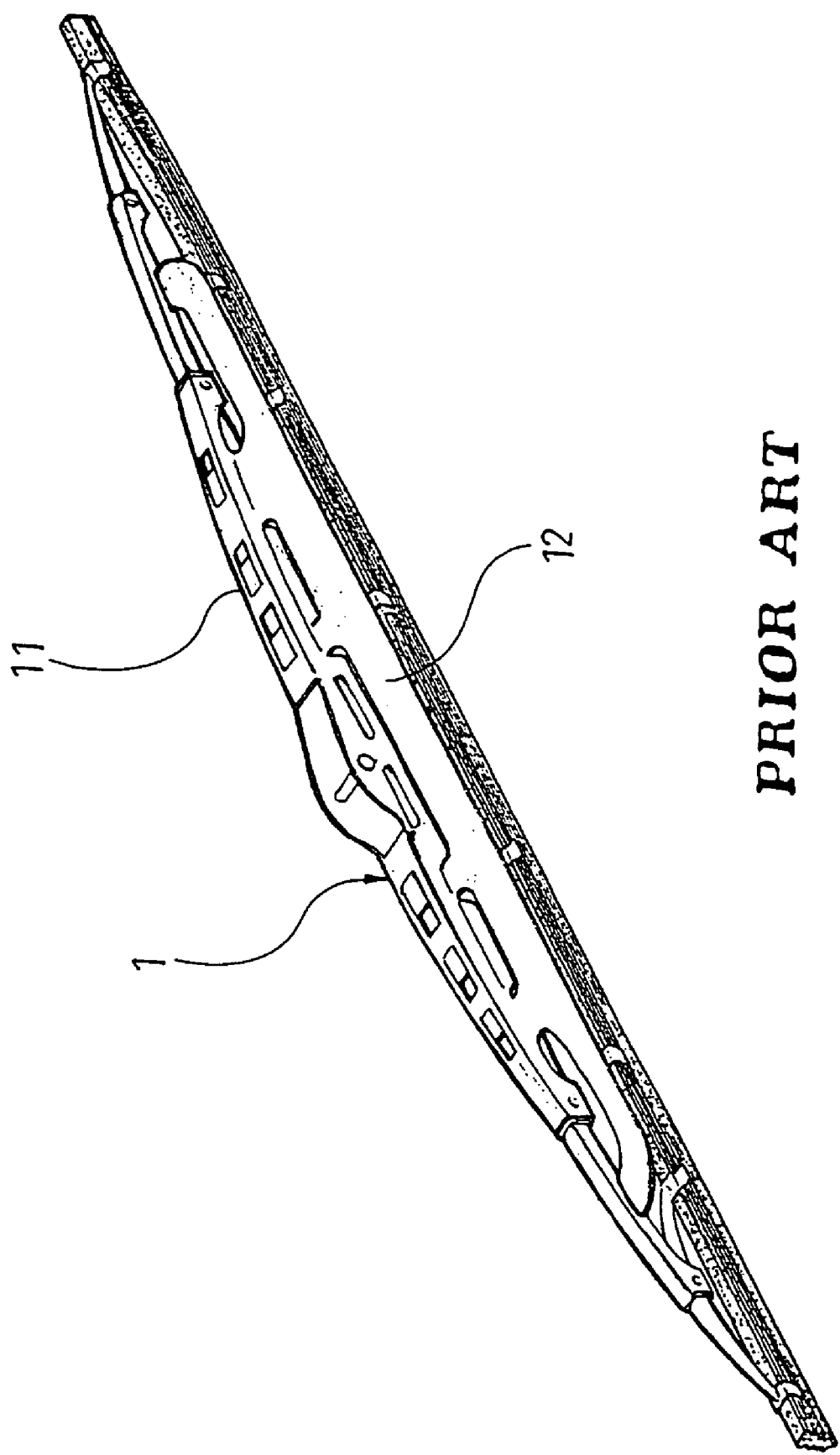
FIG. 1 is a perspective view of a windshield wiper of the prior art.
Figure 2:
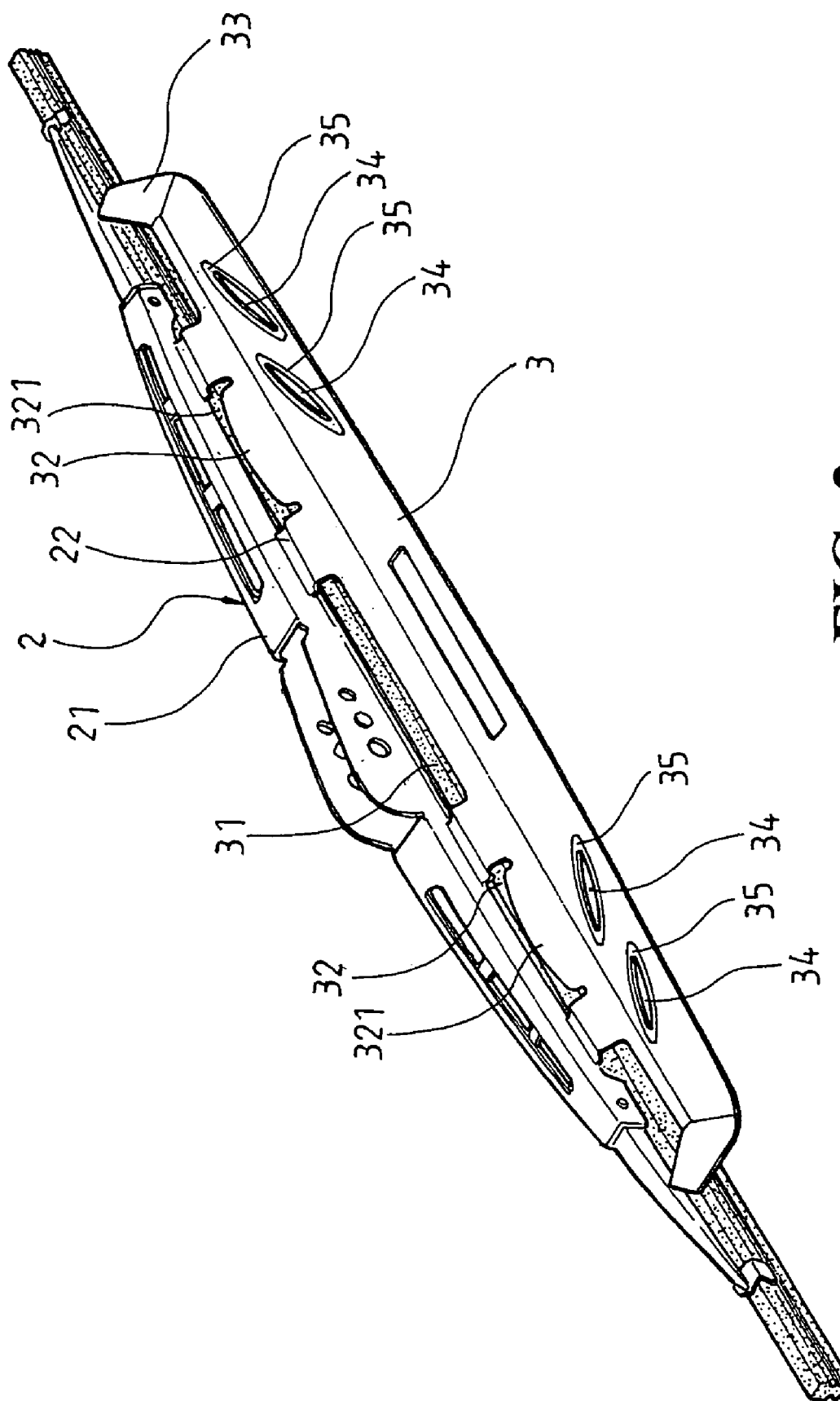
FIG. 2 is a perspective view of a windshield wiper of the present invention.
Figure 3:
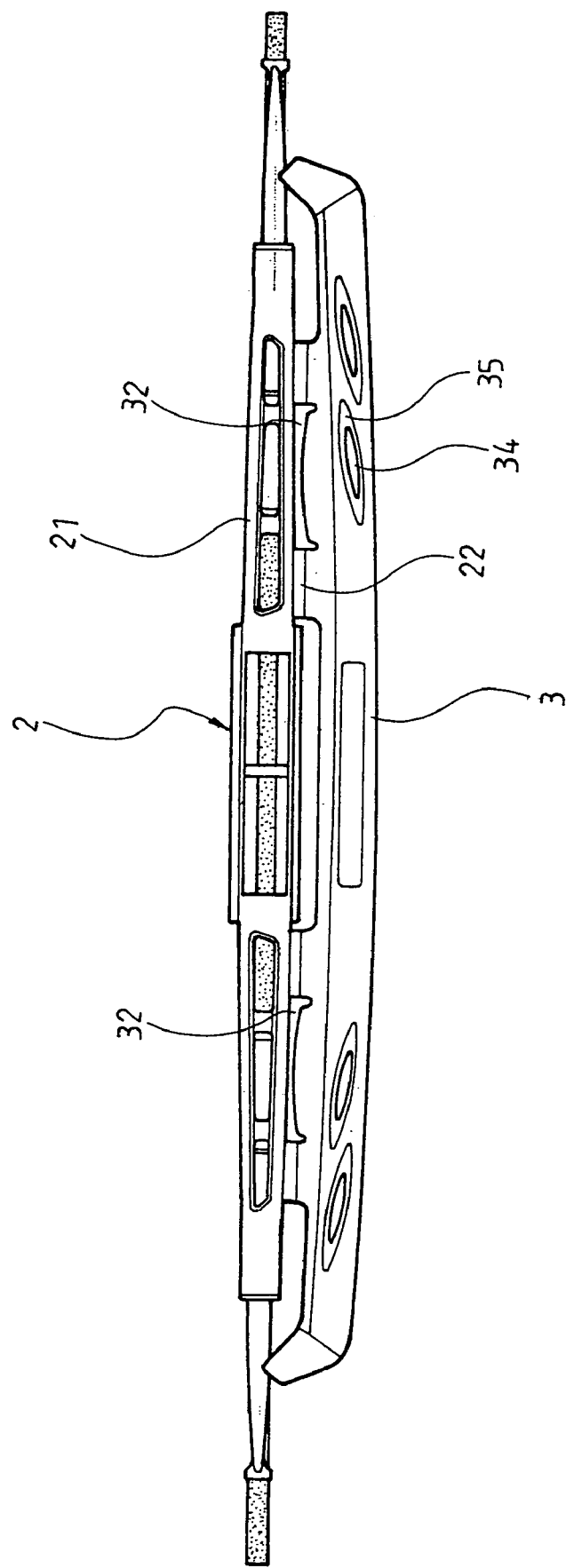
FIG. 3 is a layout of the present invention.

Referring to FIGS. 2 and 3, a preferred embodiment of the present invention is essentially having the front edge of a blade 21 of a windshield wiper 2 connected with a folded plate 22 to the body of a spoiler 3. Multiple rectangular openings 31, 32 are respectively formed in the middle and both sides of where between the spoiler 3 and the blade 21. Two rectangular openings 32 respectively provided on both sides are each provided with a plate protrusion 321. Both ends of the spoiler 3 are respectively inwardly folded for a proper length to form a slightly erected flap 33.

The spoiler 3 has an inclined surface which is formed with two ventilation holes 34 in shuttle shape and each of the ventilation holes 34 is provided on its peripheral with a shallow slot 35.

Once the wiper 2 is started, the status of the wiper 2 in meeting the wind will provide the following functions:

1. The wind force creates another disturbance at the shallow slot 35 on the peripheral of the ventilation hole 34.

2. The wind force hitting the bottom of the wiper 2 will escape upward through the ventilation hole 34 to further create a compression force to prevent the wiper from being lifted by the wind due to collection of the wind force at the bottom of the wiper 2.

3. The inclined folding on the surface of the spoiler 3 creates another compression force.

4. Those two flaps 33 on both ends of the spoiler 3 refrain the wind force from being expanding outwardly thus to create wind pillar facing inwardly to increase the compression force.

Figure 4:
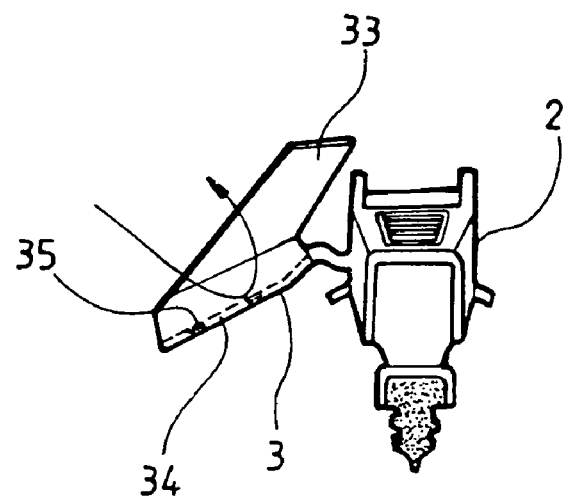
FIG. 4 is another preferred embodiment of the present invention.
Figure 5:
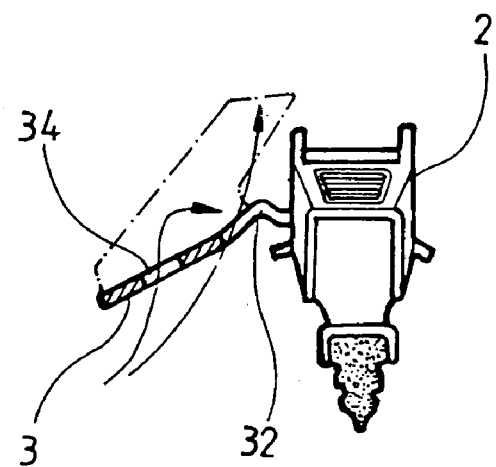
FIG. 5 is another preferred embodiment yet of the present invention.

Now referring to FIGS. 4 and 5, when the present invention is in use, the wind force hitting against the wiper 2 falls at where behind the shallow slot 35 on the peripheral of the ventilation hole 34 to create another disturbance for helping stabilize the operation of the wiper 2. The wind force hitting the bottom of the wiper 2 escapes through the ventilation hole 34 upwardly and then forms a compression force to avoid the wiper 2 from being lifted by the wind force collected at the bottom of the wiper 2. The inclined folding of the spoiler 3 helps the wind force escaping through the ventilation hole 34 to further create a compression force for the wiper 2 to stay even more flushed against the windshield to improve the results of wiping out the storm water.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A windshield wiper and spoiler combination comprising:
   a windshield wiper having a blade, said blade having a front edge;
   a spoiler having a folded plate connected with said front edge of said blade, both ends of said spoiler being each inwardly folded for a length to form a slightly erected flap, said spoiler having an inclined surface which is formed with two ventilation holes in shuttle shape at two ends of said inclined surface, each ventilation hole having a shallow slot round the periphery thereof;
   a first rectangular opening formed between an intermediate portion of said blade and said spoiler;
   a second rectangular opening formed between a first end of said blade and said spoiler, said spoiler provided with a first plate protrusion adjacent said second rectangular opening;
   a third rectangular opening formed between a second end of said blade and said spoiler, said spoiler provided with a second plate protrusion adjacent said third rectangular opening;
   whereby wind force hitting against said spoiler will fall at a place behind said shallow slot on a peripheral of said ventilation holes to create a disturbance for helping stabilize operation of said wiper, and wind force hitting a bottom of said wiper will escape through said ventilation holes upwardly thereby forming a compression force to avoid said wiper from being lifted by said wind force collected at said bottom of said wiper, and said inclined surface will help said wind force escaping through said ventilation holes to further create a compression force for said wiper thereby preventing said wiper from being lifted up for helping achieve a more smooth operation of said wiper.

* * * * *